(12) United States Patent
Shelby et al.

(10) Patent No.: US 6,984,354 B2
(45) Date of Patent: Jan. 10, 2006

(54) PROCESS FOR MAKING LABELED CONTAINERS USING A STRETCH BLOW MOLDING PROCESS

(75) Inventors: Marcus David Shelby, Kingsport, TN (US); Michael Eugene Donelson, Gray, TN (US)

(73) Assignee: Eastman Chemical Company, Kingsport, TN (US)

( * ) Notice: Subject to any disclaimer, the term of this patent is extended or adjusted under 35 U.S.C. 154(b) by 505 days.

(21) Appl. No.: 10/090,327

(22) Filed: Mar. 4, 2002

(65) Prior Publication Data

US 2002/0166833 A1 Nov. 14, 2002

Related U.S. Application Data

(60) Provisional application No. 60/289,953, filed on May 10, 2001.

(51) Int. Cl.
*B29C 49/24* (2006.01)
*A47J 41/02* (2006.01)

(52) U.S. Cl. ............... 264/509; 264/516; 215/12.1; 428/542.8

(58) Field of Classification Search ............ 264/509, 264/516; 215/12.1; 428/542.8
See application file for complete search history.

(56) References Cited

U.S. PATENT DOCUMENTS

| 4,061,705 A | 12/1977 | Marcus |
| 4,289,817 A | 9/1981 | Valyi |
| 4,662,528 A * | 5/1987 | Slat ........................... 215/12.2 |
| 4,857,258 A | 8/1989 | LeDoux et al. |
| 5,443,767 A * | 8/1995 | Cahill ..................... 264/37.31 |
| 5,753,278 A | 5/1998 | Aguilar |
| 5,980,233 A | 11/1999 | Oosaki |
| 6,001,208 A * | 12/1999 | Kinoshita et al. ........... 156/245 |
| 6,004,682 A | 12/1999 | Rackovan et al. |
| 6,150,013 A | 11/2000 | Balaji et al. |
| 6,569,276 B2 * | 5/2003 | Anderson et al. ........... 156/229 |

FOREIGN PATENT DOCUMENTS

| DE | 2135406 | 2/1973 |
| EP | 0467002 A1 | 1/1992 |
| JP | 01030729 | 1/1989 |
| JP | 02085131 A * | 3/1990 |

OTHER PUBLICATIONS

PCT International Search Report.
European Patent Office Substantive Official Communication Pursuant to Article 96(2) EPC dated Sep. 27, 2004.

* cited by examiner

*Primary Examiner*—Suzanne E. McDowell
(74) *Attorney, Agent, or Firm*—Michael K. Carrier; Bernard J. Graves, Jr.

(57) ABSTRACT

A new process for making a labeled container using a stretch blow molding process wherein a label sleeve is positioned over at least a portion of the exterior surface of a preform to produce a sleeved preform and the sleeved preform is stretch blow molded to produce a labeled container having a snug-fit label.

22 Claims, 2 Drawing Sheets

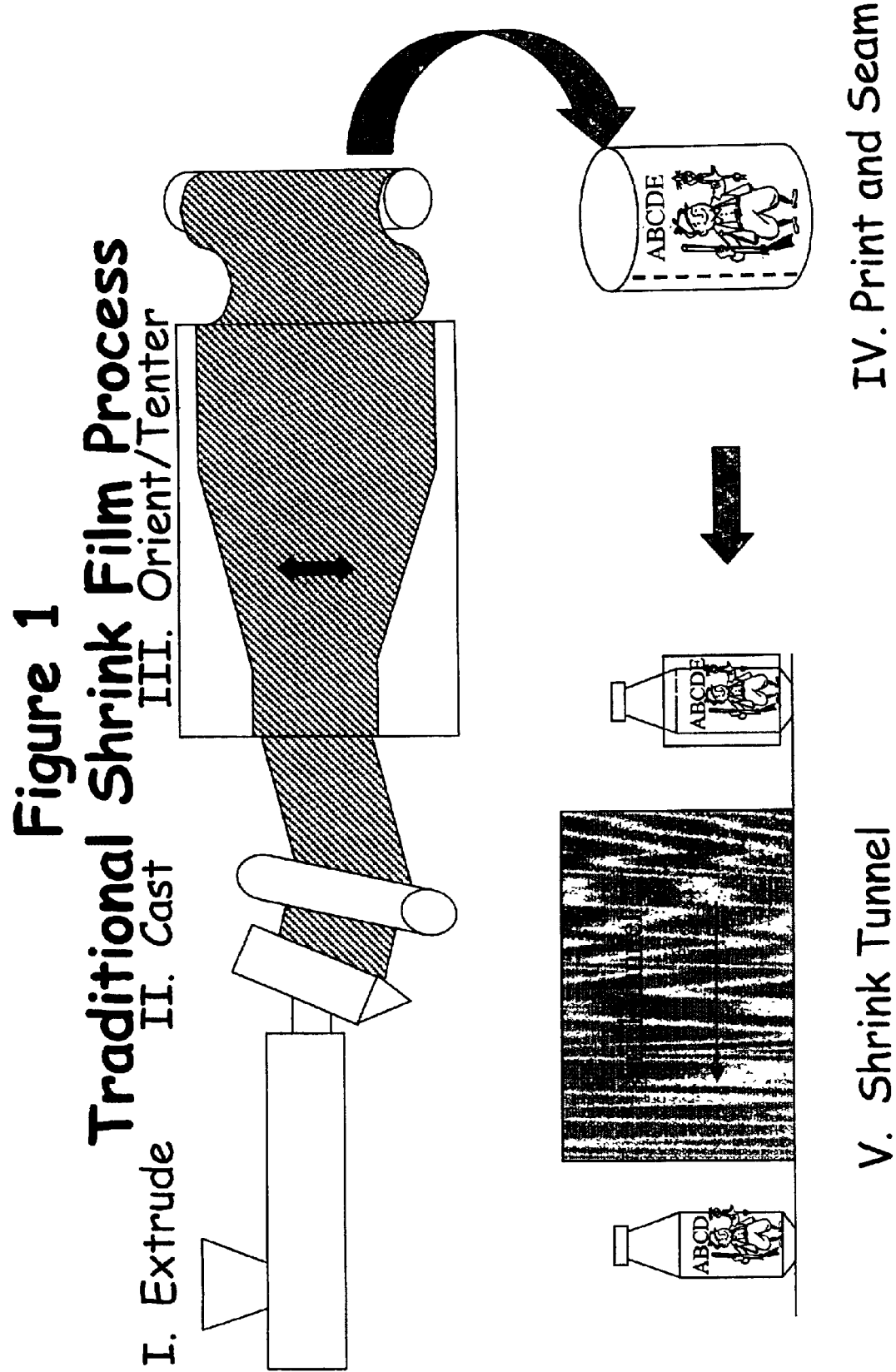

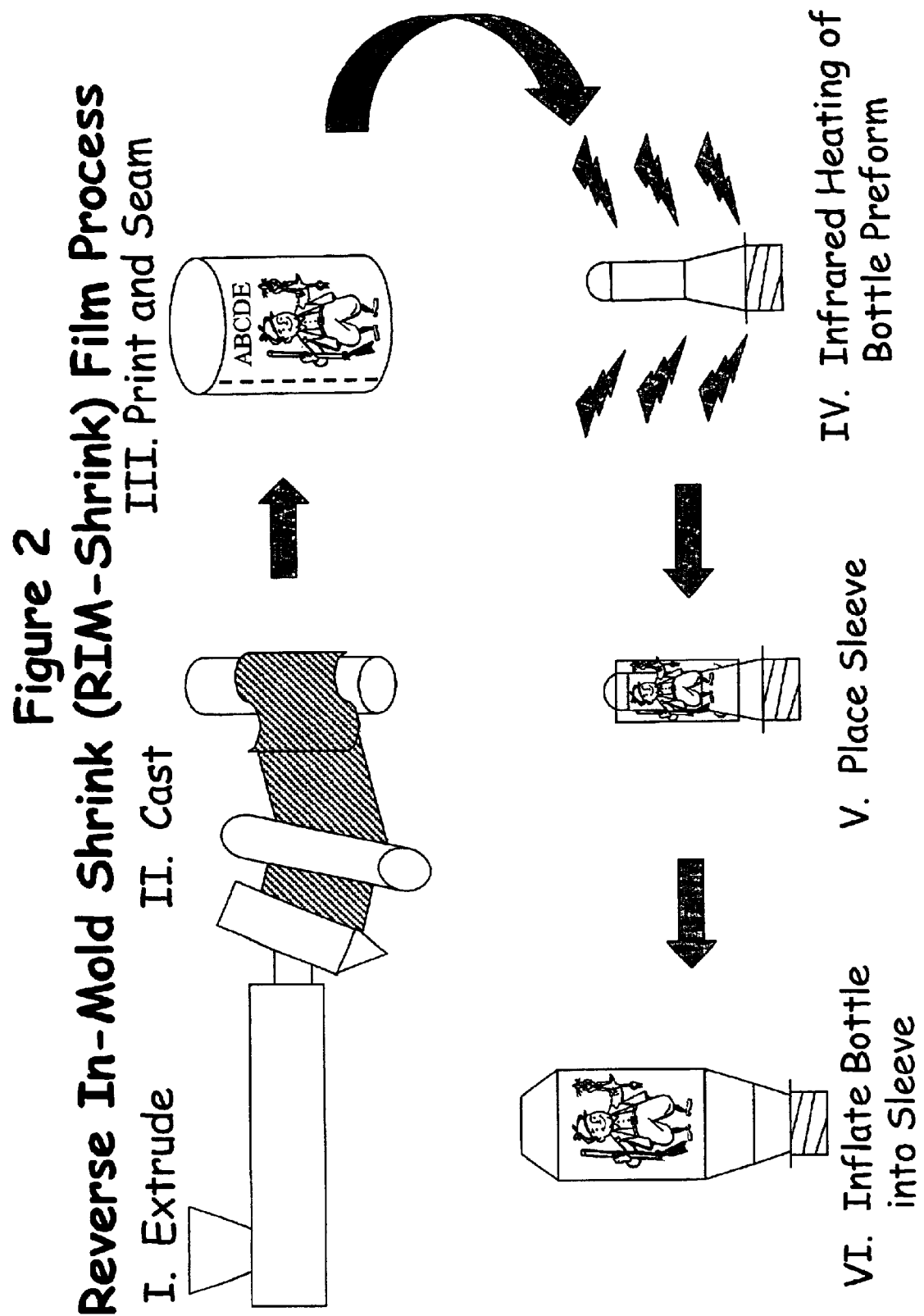

PROCESS FOR MAKING LABELED CONTAINERS USING A STRETCH BLOW MOLDING PROCESS

CROSS-REFERENCE TO RELATED APPLICATIONS

This application claims priority to U.S. Provisional Application Ser. No. 60/289,953, filed May 10, 2001, the disclosure of which is incorporated herein by this reference.

BACKGROUND OF THE INVENTION

1. Field of the Invention

This invention relates generally to processes for labeling containers and particularly to a process for making labeled containers using a stretch blow molding process.

2. Description of the Prior Art

A number of different labeling techniques are common to the bottle industry. One of the most common, particularly in the carbonated soft drink industry, is glue-on labels. These are flat decorated/labeled films that are wrapped around a bottle and glued on one edge.

Another more common labeling technique used to label extrusion blow molded containers is "in-mold" labeling. For this method, the printed label (typically made of paper or plastic film) is placed into the blow mold just prior to the parison being inflated. The heat of the hot parison as it contacts the label and mold wall causes the label to stick to the bottle, often with the assistance of a heat sensitive adhesive. Examples of this technology are described in U.S. Pat. No. 6,004,682, U.S. Pat. No. 5,980,233, and U.S. Pat. No. 5,753,278.

Another more recent development is the use of shrink fit or "contour" labels. These labels are made by printing on oriented film stock. The film is made into the shape of a tube (typically by solvent bonding one edge), placed over the container, and "heat-shrunk" around the bottle. The heat-shrinking is usually performed in a heat tunnel where the temperature is hot enough to cause the oriented label to shrink around the container. Upon passing through the heat tunnel. the oriented film/label will shrink to fit the shape of the container. The film takes the shape of the container by "form-fitting" to the container. The label is usually printed using a distortion printing process. This process effectively compensates for the final change in dimensions of film and inked pattern.

This heat shrinking, contour-fitting process can be performed using a variety of different polymers as long as the film is properly oriented. These include, but are not limited to, polyesters and copolyesters, polyvinyl chloride (PVC), polyolefins (polyethylene, polypropylene, etc), polyamides and polystyrene. It is important, however, that the temperature used to shrink the film, usually just below the glass transition temperature ("Tg") of the bottle, is low enough that the bottle does not become distorted as it passes through the shrink tunnel.

An important feature of standard contour-fitting labeling is that it requires oriented film stock. This orientation is usually induced via a tenter frame (and in some cases a machine direction orientation drafter) or a double-bubble blown film line. Both are expensive processes and add significant additional costs to methods for making and using the film. Furthermore, a shrink tunnel, which also adds cost, is required to make the oriented film shrink around the container. This extra piece of equipment also adds cost to the process.

There is, therefore, a need for less expensive and more convenient methods to apply labels to containers during the stretch blow molding process.

SUMMARY OF THE INVENTION

It is, therefore, an object of the invention to provide a process for making a labeled container using a using a stretch blow molding process.

It is another object of the invention to provide a labeled container made using a using a stretch blow molding process.

It is a further object of the invention to provide a sleeved preform useful for making a labeled container using a stretch blow molding process.

It is another object of the invention to provide a less expensive and more convenient process for making a labeled container using a using a stretch blow molding process.

These and other objects are achieved using a new process for making a labeled container using a stretch blow molding process wherein a label sleeve is positioned over at least a portion of the exterior surface of a preform to produce a sleeved preform and the sleeved preform is stretch blow molded to produce a labeled container having a snug-fit label. The process eliminates the shrink tunnel and film orientation steps required by prior art processes thereby decreasing the cost and increasing the convenience of processes for making blow molded label containers.

Other and further objects, features and advantages of the present invention will be readily apparent to those skilled in the art.

BRIEF DESCRIPTION OF THE DRAWINGS

FIG. 1 shows a conventional labeling process.

FIG. 2 shows the labeling process of the present invention.

DETAILED DESCRIPTION OF THE INVENTION

In one aspect, the present invention provides a process for making a labeled container. The labeled container is made by positioning a label sleeve over at least a portion of the exterior surface of a preform to produce a sleeved preform and stretch blow molding the sleeved preform to produce a labeled container. The label sleeve, which does not have to be oriented prior to use, expands in the mold to "form-fit" to the container sidewall and produce a container with a snug or tight fitting label. The present invention eliminates both the shrink tunnel and film orientation steps required by prior art processes thereby decreasing the cost and increasing the convenience of processes for making blow molded label containers.

In another aspect, the present invention provides a labeled container made according to the process of the present invention. The container has a label that fits snugly around at least a portion of the container, i.e., the label should fit to the container such that it does not move when the container is handled in a typical manner for the container.

In a further aspect, the present invention provides a sleeved preform made from a preform useful in the blow molding process for producing containers and a label sleeve fitted over at least a portion of the exterior surface of the preform. The sleeved prefrom is useful for producing a labeled container made according to the process of the present invention.

A preferred label sleeve useful in the present invention is a distortion printed label sleeve designed to fit over the preform prior to blow molding the preform to produce a container. The label sleeve is made from either oriented or unoriented polymer film stock that expands with the inflating preform. Preferably, the sleeves are made from unoriented film stock because the resulting sleeve will be oriented with the preform during the blow molding process. Use of unoriented polymer film stock for the label sleeve simplifies the film stock manufacture process by eliminating the additional tenter frame or double-bubble step required to stretch the film. Also, orientation steps are expensive to implement and add cost to the shrink film labeling process for containers. In another embodiment, the sleeves are made from biaxial or uniaxially oriented film stock.

The polymer film stock for making label sleeves useful in the present invention can be made using known techniques. Preferably, the film stock is made using the traditional flat film casting process or single-bubble blown film line common to the film industry. The film thickness can vary depending on how much stretch will occur in the blow molding step and the desired final label thickness. Normal thickness for the final stretched label extend up to and including about 2 mils but can be higher if the application requires. Thus, the thickness of the film stock will be a multiple of the final thickness that is necessary to allow for label stretching. For example, for a two liter bottle, the sidewall stretch ratios are typically about 4 times in the radial direction and 2.5 times in the axial direction resulting in a total planar stretch ratio of 4 times 2.5, or 9 times. The thickness of the bottle sidewall is therefore reduced by 1/9 during the stretching process. For a label that is tight fitting to the preform, the label will undergo this same stretch ratio and therefore must be 9 times thicker than the final desired thickness, e.g., for a 1 mil final label thickness the starting label should be 9 mils thick. Typically however, the labels will not be tight fitting and will therefore not undergo the full 9 times reduction in thickness. For example, if the starting label is twice the diameter of the preform (very loose fitting), it might undergo a reduction in thickness of only 4 to 5 times. Exact tube thickness will therefore vary depending on the geometry of the starting label relative to the preform and the blow up ratios of the container. Selecting these parameters is within the purview of the skilled artisan.

The label film stock is made from any polymer that can survive the necessary stretch conditions during the blow molding process. Typically, this requires that the polymer either have a glass transition temperature ("Tg") that is less than the selected blow temperature (PET used for many soda bottles has a Tg of 77° C.) or that the label sleeve be suitably heated just prior to blow molding. Any polymer than can significantly distort without tearing at temperatures of from about 23° C. to about 110° C. will function in the present invention. Numerous such polymers are known to skilled artisans. Suitable polymers include, but are not limited to, polyesters, copolyesters, polyolefins, polyamides, ethyl vinyl alcohol ("EVOH"), elastomer blends, copolymers of elastomer blends, and mixtures thereof. Polyesters, copolyesters, and polyolefins such as polyethylene and polypropylene are preferred. Polyesters such as poly (ethyleneterephthalate) ("PET") and copolyesters have orientation properties similar to the container so the stretching process is more closely matched with the inflating preform. Polypropylene is preferred because it is the current label material of choice in the industry due to its low cost and the fact that it is easily separated in a recycle stream via flotation because polypropylene's density is less than that of water.

The label sleeve film used in the process must be printed with the desired label design using methods well know to skilled artisans. Preferably, a distortion printing process that compensates for the expansion that the film will undergo during the blow-molding process is used. Since expansion will vary from point to point, i.e., the container neck will expand less than the sidewall, the distortion-printing pattern will have to be varied accordingly. Printing is usually performed on flat film that requires the edges to be bonded together to make a sleeve tube. However, if the film is created using a blown film process, printing the tube directly without going through the slitting and rebonding process is possible. The most desirable label sleeve printing process for a particular application will depend upon the pattern desired and the type of equipment that will be used to produce the container. In addition, blown film is suitable for applications where printing is not required but functional additives are desirable. For example, a colorant or pigment can be added to the polymer to make colored label sleeves. Similarly, a UV blocking concentrate, barrier layer, or other functional additive can be incorporated into the polymer used to make the label sleeve. Similarly, a pigmented tube can be fitted around the preform to change the overall color of the container and a traditional glue-on label then applied over the top of the pigmented sleeve.

Label sleeve printing is only limited by the printability of the base polymers or resins. For example, if a polyester label sleeve is used, the sleeve is printed by traditional rotogravure or flexographic processes common for traditional shrink labels. However, other printing processes such as offset lithography and screen printing can also be used on suitable substrate films.

The film is ready for the blow molding process after the pattern is printed and the sleeve is formed. Methods for forming the sleeve are well known, e.g., solvent bonding, thermal bonding, or adhesive bonding.

In the preferred embodiment, the label sleeve diameter is slightly larger than the diameter of the preform, preferably just large enough to easily slide over the preform. If the diameter is too large, the sleeve will stretch unevenly in some places unless some sort of indexing or registration equipment is available to hold the sleeve in the proper place.

In another embodiment, although more difficult to handle, the label sleeve diameter is significantly larger than the diameter of the preform. The larger sleeve does not diminish the print quality during the stretching of the film because of the lower stretch ratio.

The label sleeve must be open on at least one end to allow it to be positioned over the preform. Optionally, the sleeve may be closed at one end to form a tube, may cover a small part of the preform such as a part of the section that will become the sidewalls, or may cover virtually the entire preform from just below the threads to the bottom of the preform base.

The preforms can be made either by the traditional injection molding process or by extrusion blow molding. For extrusion blow molding, a pipe of polymer is extruded, pinched off at both ends, and then immediately inflated into the bottle while the tube is still hot. Extrusion blow molding is the preferred method for making most polyolefin containers like milk jugs and shampoo bottles. As with injection molded preforms, the stretched sleeve of the present invention is placed over the pinched tube prior to inflation. As extrusion blow molding typically involves hotter polymer temperatures where melt strength is lower, care has to be taken to ensure that the sleeve is sufficiently hot and pliable, otherwise the container will not stretch properly. Fortunately the hotter temperatures will help to soften the sleeve more quickly. The term "blow molding" as used herein includes stretch blow molding processes and extrusion blow molding processes. The present invention includes all of the various forms of stretch blow molding (e.g., single stage and 2-stage) and the various forms of extrusion blow molding (e.g., wheel type and accumulator head).

The preforms used in the present invention are formed from conventional molding polymers such are polyester, polyolefins, and polycarbonates. The polymers may be monolayer or multilayer. Other polymers may be used to form some layers of multilayer containers. Such polymers are well known in the art and include recycled polymers such as polyesters, performance polymers such as EVOH and polyamides, wholly aromatic polyesters, polyethers; blends, and copolymers thereof.

Polyesters are the preferred polymer useful in the present invention. Suitable polyesters comprise a dicarboxylic acid component preferably comprising terephthalic acid or isophthalic acid, preferably at least about 50 mole % terephthalic acid, and in some embodiments, preferably at least about 75 mole % terephthalic acid and a diol component comprising at least one diol selected from ethylene glycol, cyclohexanedimethanol, diethylene glycol, butanediol and mixtures thereof. The polyesters may further comprise comonomer residues in amounts up to about up to about 50 mole percent of one or more different dicarboxylic acids and or up to about up to about 50 mole percent of one or more diols on a 100 mole % dicarboxylic acid and a 100 mole % diol basis. In certain embodiments comonomer modification of the dicarboxylic acid component, the glycol component or each individually of up to about 25 mole % or up to about 15 mole % may be preferred. Suitable dicarboxylic acid comonomers comprise aromatic dicarboxylic acids, esters of dicarboxylic acids, anhydrides of dicarboxylic esters, and mixtures thereof. More specifically suitable dicarboxylic acid comonomers include aromatic dicarboxylic acids preferably having 8 to 14 carbon atoms, aliphatic dicarboxylic acids preferably having 4 to 12 carbon atoms, or cycloaliphatic dicarboxylic acids preferably having 8 to 12 carbon atoms. Examples of dicarboxylic acid comonomers comprise phthalic acid, isophthalic acid, naphthalene-2,6-dicarboxylic acid, cyclohexanedicarboxylic acid, cyclohexanediacetic acid, diphenyl-4,4'-dicarboxylic acid, diphenyl-3,4'-dicarboxylic acid, succinic acid, glutaric acid, adipic acid, azelaic acid, sebacic acid, mixtures thereof and the like.

Suitable diol comonomers comprise cycloaliphatic diols preferably having 6 to 20 carbon atoms or aliphatic diols preferably having 3 to 20 carbon atoms. Examples of such diols comprise triethylene glycol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentanediol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4 tetramethylcyclobutanediol, 2,2-bis-(3-hydroxyethoxyphenyl)-propane, 2,2-bis-(4-hydroxypropoxyphenyl)-propane, isosorbide, hydroquinone, mixtures thereof and the like. Polyesters may be prepared from two or more of the above diols.

Preferred comonomers comprise isophthalic acid, dimethyl isophthalate, dimethyl-2,6-naphthalenedicarboxylate, 2,6-naphthalenedicarboxylic acid, diethylene glycol, 1,4-cyclohexane-dimethanol, 1,4-butanediol, trimellitic anhydride, mixtures thereof and the like. Bifunctional comonomers, such as hydroxybenzoic acid may also be included.

The polyesters of the present invention may also comprise additives normally used in polyesters if desired. Such additives include, but are not limited to colorants, toners, pigments, carbon black, glass fibers, fillers, impact modifiers, antioxidants, stabilizers, flame retardants, reheat aids, acetaldehyde reducing compounds, oxygen scavengers, barrier enhancing aids and the like.

As used in the specification and concluding claims, residue refers to the moiety that is the resulting product of the chemical species in a particular reaction scheme or subsequent formulation or chemical product, regardless of whether the moiety is actually obtained from the chemical species. Thus, an ethylene glycol residue in a polyester refers to one or more —$OCH_2CH_2O$— repeat units in the polyester, regardless of whether ethylene glycol is used to prepare the polyester. Similarly, a sebacic acid residue in a polyester refers to one or more —$CO(CH_2)_8CO$— moieties in the polyester, regardless of whether the residue is obtained by reacting sebacic acid or an ester thereof to obtain the polyester.

Preforms are formed via methods well known in the art, such as by injection molding or, less commonly, by pipe extrusion and swaging. The preforms are first reheated to the desired blow temperature (usually around about 100° C. for PET preforms) using a bank of infrared lamps such as on a Sidel™ type of machine. After infrared heating, the hot preforms are then directly conveyed to the blow wheel where they are inflated into the mold. However, for the present invention, another step must be added. Here the preform sleeves are slid over the preforms at any point just prior to the preforms entering the molding wheel. The sleeves should be cut to the appropriate length, depending on how much contour label coverage is desired on the final bottle. This can be done in-situ as the sleeves are placed over the preforms or the sleeves can be precut into discrete units. Either way, an appropriate web/film handling system is required to rapidly place the sleeves over the preforms. Systems commonly used for regular in-mold labeling in the industry can be modified to handle the sleeves.

In the blow molding process, the preform and sleeve will enter the blow mold and be inflated to the final container shape. The residual heat of the preform will serve to heat the sleeve so that it will be pliable enough to stretch. Alternately, hot air or radiant heat can be blown/applied across the two. Because the sleeve and preform will be tacky at the higher temperatures, the chance that sleeve will slide off as the preform is inverted (as is the case with some blow molding machines) is small. Indexing and registration equipment can be used to hold the sleeve in place relative to the preform if necessary. As the preform expands due to the air pressure and stretch rod, the label sleeve also expands. Ultimately, the label will take on the final shape of the article as it will stretch until it hits the mold wall. Thus, a tight fitting, contour label is created without the need for biaxially oriented film, or a shrink tunnel.

In one embodiment, the sleeve is placed over the preform prior to reheating. For infrared heating of preforms, this can only be done if the sleeve and the inks used to print the sleeve do not excessively absorb the infrared radiation. If for example, the inks blocked the IR radiation, the sleeve would have hot spots at the ink location and the preform would have cold spots below the label. This could result in uneven stretching of both preform and label.

Because the label can be made of a variety of polymers, the use of an in-situ contour fitting label also adds other functional possibilities. For example, the label can be made of a high barrier polymer like EVOH or metazylene diamine ("MXD6") (either as a single layer or multilayer through coextrusion) to help reduce the permeability of the container. The degree of adhesion between bottle and label can also be influenced via the resin selection. Tests using PET labels to PET bottles resulted in significant adhesion whereas polypropylene labels would not stick to PET bottles. Whether adhesion is desired or not usually depends upon whether separation for recycling is an issue.

Other possible applications are part of the present invention. For example, pigmented and/or decorative films such as an iridescent body label can be added to the container. In addition, for hotfill and pasteurization, a high Tg shrink label can be applied that resisted the creep and deformation of the bottle as it pressurized and softened under the extreme pasteurization conditions. Current PET containers have difficulty surviving pasteurization because they become too soft at the higher temperatures. Finally, these shrink labels may also be useful for minimizing plateout in heatsetting applications. If, for example, a polypropylene shrink label is applied to a PET bottle, the likelihood of PET oligomer plating-out on the heatset blowmold is essentially eliminated.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

Two-Liter Contour Labeling Using PET Sleeves

Sleeves of slightly oriented PET 12822 film were made using a blown film process. These sleeves had a diameter of 1.44 inches and were nominally 4 mils thick. To simulate labeling, a grid pattern was drawn on the sleeve prior to testing using a permanent marker. The preforms used were two-liter bottle preforms having an outer diameter of 1.15 inches. The sleeve was a lot larger than the preform but this was the only sleeve diameter available at the time of testing.

Reheat blow molding was performed using a lab-scale RHB unit. The preform was first heated using a bank of infrared quartz type heaters to a temperature of approximately 100° C. Next the preform was rapidly transferred to the blow molding station. Prior to closing the mold, however, a sleeve was placed over the preform. The sleeve was nominally cut the length of the preform such that one end contacted the neck ring and the other just barely extended past the base end of the preform (ca. 5 inches). A soak time of 25 seconds was used to allow the hot preform to transfer heat to the film. The preform was then blown using a combination of an axial stretch rod and air pressure.

Upon removing from the mold, the label film was found to almost completely envelop the bottle and fit tightly to all of the contours. The grid pattern drawn on the initial sleeve expanded in proportion to the amount of stretch in the bottles (i.e. lower in the neck region and higher in the sidewall region), thus giving an idea of how much distortion printing compensation would be required. The label film after stretching was nominally about ½ mil or less depending on the amount of stretch.

EXAMPLE 2

Two-Liter Contour Labeling Using Polypropylene Sleeves

Following a procedure similar to that in Example 1 above, sleeves were made via the blown film process using polypropylene instead of PET. Polypropylene is desirable because it is already the material of choice for labels because of its low cost and low density. The polypropylene was nominally 3 mils thick and 1.6 inches wide. After blowing the bottles as with Example 1, the film was found to fit snuggly to the contour of the bottle. However, in contrast to the PET label film, it did not adhere to the base bottle so it can be easily separated during recycle.

EXAMPLE 3

1.5 Liter Refillable Contour Labeling with PET Adding the Sleeve Prior to IR Heating The PET sleeve used in Example 1 was applied to a 1.5 liter preform having a 1.25 inch nominal outer diameter. However, since this particular preform and mold combination was attached to a different reheat blow molding machine, the process had to be modified slightly. At the time of the experiment, there was no way to stop the machine long enough between heating and blowing to attach the preform sleeve. Therefore, the preform sleeve was placed on the preform before the infrared heating step began and the sleeve went through the full heating and blowing process. The sleeves were also labeled with a grid via a black permanent marker. During the heating step, the sleeves were observed to shrink down slightly around the preforms thus enhancing their adhesion. During the blow step, the sleeve stretched nicely and the grid was uniformly distorted creating an attractive form fitting label. Adhesion to the bottle, however, was greater than for Example 1 where the sleeve was added after heating. This was most likely due to the extra heat which allowed the label and bottle more time to stick together.

EXAMPLE 4

1.5 Liter Refillable Contour Labeling with Polypropylene Adding the Sleeve Prior to IR Heating A test was performed to see whether polypropylene sleeves can be added to the preform prior to infrared heating. Following a procedure similar to Example 3, the polypropylene sleeves (labeled with a black ink grid) were placed over the preforms and then sent through the heater and blowing process. Unlike the PET however, the polypropylene labels were found to distort and tear significantly at various points on the film after blow molding. It appeared that the ink was absorbing more IR radiation for the polypropylene film and thus caused it to stretch further and tear in localized spots. Unless an ink system is used that does not alter the infrared absorption characteristics of the film too greatly, it is doubtful that the polypropylene labels can be placed on the preform before infrared heating.

In the drawings and specification, there have been disclosed typical preferred embodiments of the invention and, although specific terms are employed, they are used in a generic and descriptive sense only and not for purposes of limitation, the scope of the invention being set forth in the following claims. Obviously many modifications and variations of the present invention are possible in light of the above teachings. It is therefore to be understood that within the scope of the appended claims the invention may be practiced otherwise than as specifically described.

What is claimed is:

1. A process for making a labeled container using a blow molding process, comprising:

positioning an unoriented film label sleeve over at least a portion of the exterior surface of a preform to produce a sleeved preform; and blow molding the sleeved preform to produce a labeled container.

2. The process of claim 1 wherein the label sleeve is a distortion printed label sleeve.

3. The process of claim 1 wherein the label sleeve is an unprinted label sleeve.

4. The process of claim 3 wherein the label sleeve contains functional additives.

5. The process in claim 1 wherein the label sleeve is made from a polymer selected from the group consisting of polyesters, copolyesters, polyolefins, polycarbonates, polystyrenes, polyamides, ethyl vinyl alcohol, elastomer blends, copolymers of elastomer blends, and mixtures thereof.

6. The process in claim 1 wherein the label sleeve is made from a polymer selected from the group consisting of polyesters, copolyesters, polyolefins, and mixtures thereof.

7. The process in claim 1 wherein the label sleeve is heated just prior to blow molding.

8. The process in claim 1 where the label sleeve is made from a polymer selected from the group consisting of monolayer film or multilayer coextruded film.

9. The process in claim 8 where one or more of the layers in the film is a barrier polymer.

10. The process of claim 9 wherein the barrier polymer is selected from the group consisting of ethyl vinyl alcohol or metazylene diamine.

11. The process in claim 1 wherein the label sleeve diameter is slightly larger than the diameter of the preform.

12. The process in claim 1 wherein the label sleeve diameter is significantly larger than the diameter of the preform.

13. The process in claim 12 wherein the label sleeve is held in place on the preform.

14. The process in claim 1 wherein the blow molding process is stretch blow molding.

15. The process in claim 1 wherein the blow molding process is extrusion blow molding.

16. A labeled container made according to the process of claim 1.

17. The labeled container of claim 16 wherein the label sleeve fits snugly around at least a portion of the container.

18. A process for making a labeled container using a blow molding process, comprising:

positioning a label sleeve over at least a portion of the exterior surface of a preform to produce a sleeved preform; and blow molding the sleeved preform to produce a labeled container, wherein the label sleeve is made from a polymer that can distort without tearing at temperatures of from about 23° C. to about 110° C.

19. A process for making a labeled container using a blow molding process, comprising:

positioning a label sleeve over at least a portion of the exterior surface of a preform to produce a sleeved preform; and blow molding the sleeved preform to produce a labeled container, wherein the label sleeve is made from a polymer that has a glass transition temperature less than the selected blow temperature.

20. The process of claim 19 wherein the label sleeve is made from a polymer film stock selected from the group consisting of oriented and unoriented film stock.

21. The process of claim 19 wherein the label sleeve is a contour label sleeve made from oriented film stock and the container is a contoured container.

22. A sleeved preform useful for making a labeled container, comprising:

a preform useful in a blow molding process for producing containers; and an unoriented film label sleeve fitted over at least a portion of the exterior surface of the preform.

* * * * *